June 30, 1970   D. G. SCHWEITZER   3,518,496
SUPERCONDUCTOR MAGNETIC ENERGY STORAGE SYSTEM
Filed Jan. 24, 1968   2 Sheets-Sheet 1

INVENTOR.
DONALD G. SCHWEITZER
BY
Roland A. Anderson

United States Patent Office 3,518,496
Patented June 30, 1970

3,518,496
SUPER CONDUCTOR MAGNETIC ENERGY STORAGE SYSTEM
Donald G. Schweitzer, Bayport, N.Y., assignor to the United States of America as represented by the United States Atomic Energy Commission
Filed Jan. 24, 1968, Ser. No. 700,234
Int. Cl. H01v 11/16
U.S. Cl. 317—123                                6 Claims

ABSTRACT OF THE DISCLOSURE

System for selectively storing and releasing magnetic energy in a superconductor without external connections to a power supply, in which the superconductor is cooled to a first temperature below its critical temperature and exposed to an hysteretic magnetic field cycle selectively to reduce the magnetic moment of the superconductor to zero in the absence of an externally applied magnetic field thereby to store residual magnetic energy in the superconductor mass which can be selectively released from the superconductor by the warming thereof.

BACKGROUND OF THE INVENTION

In various research and industrial applications, a need exists for methods and apparatus for storing magnetization. This magnetization has been of the order of several hundred gauss and is of particular interest in the kilogauss range for accelerators and plasma research reactors. Permanent magnets, have generally been heavy, bulky and hard to handle or they have been limited to small, magnetic fields. Also, it has been difficult or impossible with these or other systems, including the superconducting systems known heretofore, selectively to store and safely or easily to release large amounts of magnetic energy. Moreover, the superconductors known heretofore have required provision for connections to external power supplies. It has additionally been advantageous selectively to store and localize variable amounts of magnetic energy and to release this stored energy with a well defined temperature dependance.

SUMMARY OF THE INVENTION

The invention described herein was made in the course of, or under a contract with the U.S. Atomic Energy Commission.

It has been discovered, in accordance with this invention, that variable amounts of magnetic energy can be easily, safely and selectively localized, stored and released in hysteretic superconductors of the type displaying low diamagnetic behavior even without connections from the superconductors to external power supplies. More particularly, the magnetism is selectively localized and/or stored by cooling the superconductor to a temperature below its critical temperature and exposing the superconductor to an hysteretic magnetic cycle of sequentially applied and removed magnetic field steps of opposite polarity above or below the critical magnetic field of the superconductor whereupon the stored magnetic energy can be safely, easily and selectively released by warming the superconductor. With the proper selection of hysteretic magnetic cycles, the application and removal of external fields therein, and the proper selection of superconductors and temperatures, as described in more detail hereinafter, the desired magnetic energy storage, release and well defined temperature dependance are achieved.

BRIEF DESCRIPTION OF THE DRAWING

In the drawings where like elements are referenced alike.

DESCRIPTION OF THE PREFERRED EMBODIMENT

It is known that superconductors for producing magnetic fields have well defined critical characteristics of temperature ($T_c$) whereby the conductor changes to its normal resistance state at $T_c$. This feature is described, for example, in U.S. Pat. 3,177,408, which describes a superconductor that produces magnetic fields in the kilogauss region below the critical field $T_c$.

It is also known that bulk superconductors can be divided into two categories, called Type I and Type II Superconductors. As described in the March 1967 Scientific American, pp. 115 et seq., these two types are distinguished from each other by the way they behave in an external magnetic field. The Type I superconductor, for example, totally excludes the external magnetic field from the interior of the superconductor mass up to a certain point, known as the critical field ($H_c$), whereupon the mass suddenly loses all trace of superconductivity and the magnetic field penetrates fully into the interior of the mass thereof. In the type II superconductor, on the other hand, the external field is excluded over a first temperature range and partial penetration occurs below that temperature. The invention hereinafter described utilizes a superconductor of the latter type in which magnetic energy is stored by the application of a hysteretic magnetic cycle that produces zero magnetic moment in a zero external field. This stored magnetic energy is then released with a well defined temperature dependence by the warming of the superconductor.

A detailed technical discussion of the principles involved in this invention, as well as the testing procedures and apparatus employed, is given in my article co-authored with M. Garber, on "Experimental Tests of the Critical-State Model for Hysteretic Superconductors," which was published in Physical Review Letters on Feb. 6, 1967; my article co-authored with M. Garber and B. Bertman, on "Hysteresis in Superconductors. I. Flux Trapping in Low and High-k Materials," which was published in Physical Review on July 10, 1967; and in my article co-authored with M. Garber, "On the Entropy of Hysteretic Superconducting States," which was published in Physics Letters on Feb. 27, 1967.

Figure 1:
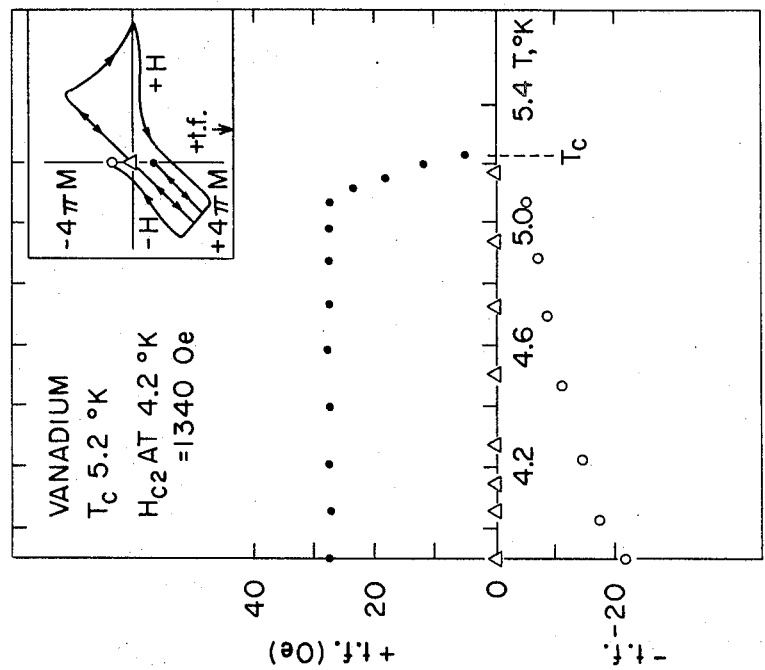
FIG. 1 is a graph of the retained fields in vanadium exhibiting diamagnetism at low temperature illustrating three general types of hysteretic cycles.

In order to explain how the hysteretic method and the apparatus of this invention accomplish the function of storing and releasing magnetic field energy, reference is made to FIG. 1, wherein is illustrated the temperature changes of retained fields (where the externally applied field strength $H=0$) resulting from three general types of hysteretic cycles for a vanadium sample exhibiting diamagnetism. The upper curve corresponds to the changes in retained field for $H=0$ where the net polarity of the internal field is the same as that of the external field $H$ that is applied initially. The data falling on the horizontal zero magnetic moment line were obtained by choosing an initial cycle that leads to an average value of $\overline{M}=0$ for $H=0$, as shown in the insert, where M equals magnetic moment and H equals externally applied field strength. The lower curve denotes the changes after a cycle that produces a retained field with net negative polarity, i.e., opposite to that of the field applied initially.

Figure 2:
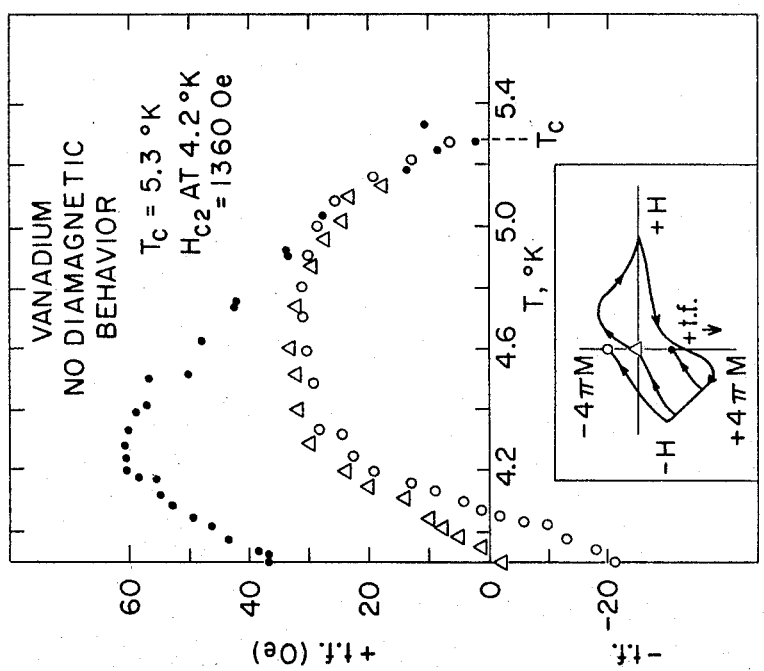
FIG. 2 is a graphic illustration for the cycles of FIG. 1 in the vanadium thereof without diamagnetism.

The changes for corresponding cycles in the vanadium without diamagnetism are shown in FIG. 2. In this case it was found that the initial state is which $\overline{M}=0$ when $H=0$ does not correspond to a state in which no flux exists in the superconductor, but is a state in which a finite internal field exists with both polarities simultaneously under the condition that the field vector average is zero. Moreover, upon heating it has been discovered that the fields corresponding to the negative polarity are expelled preferentially, with approximately a linear temperature dependence, leading to an increase in positive magnetization.

The shape and magnitude of the maxima depend upon the temperature at which the initial field cycle was performed. Thus, when a state of $\overline{M}=0$ was obtained at 1.7° K. by the type of cycle denoted by the triangles in FIG. 2, the effect was five times greater. Also, the curve obtained between 1.7° K. and 5.3° K. had the maximum plateau at 150 oersteds extending between 3.4° K. and 4.5° K.

Figure 3:
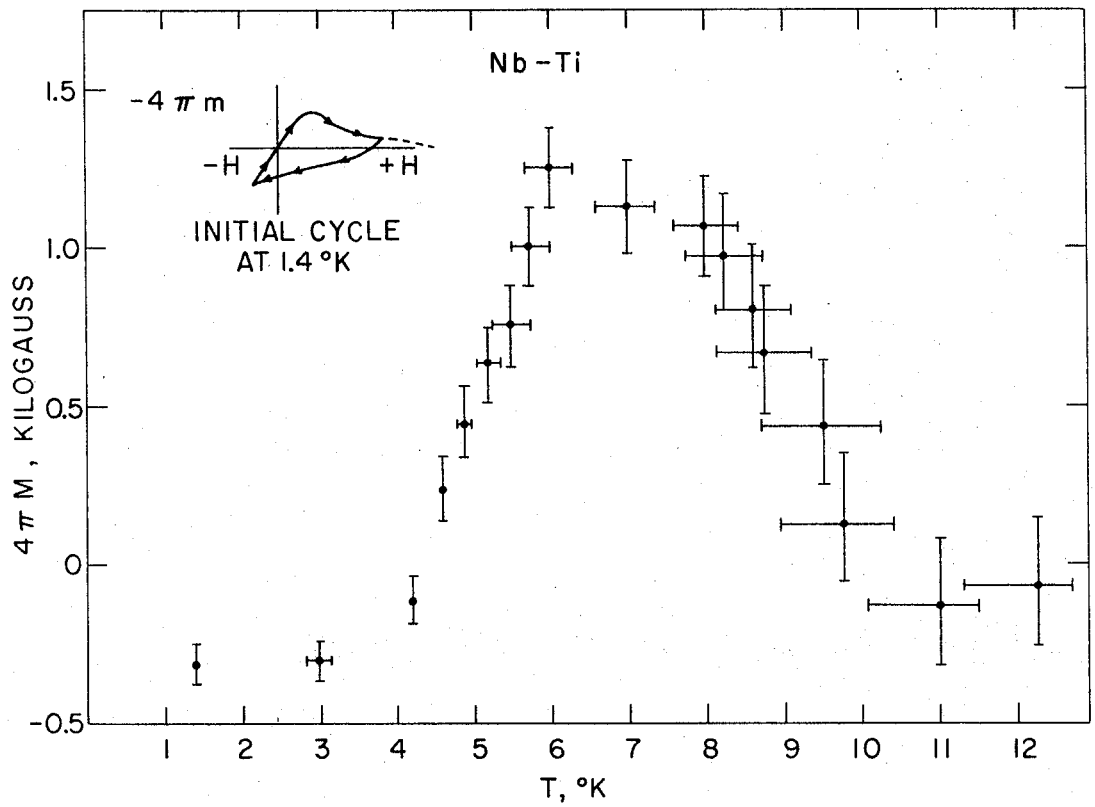
FIG. 3 is a graphic illustration of the effects of cycles corresponding to those of FIG. 1 in Nb-Ti.

In FIG. 3, the same effect is shown for Nb-Ti. In this case the $\overline{M}=0$ state was obtained from a minor hysteresis cycle at 1.4° K. The magnetization value at the maximum corresponds to about 50% of the maximum trapped field (TF) at 1.4° K. This suggests that the total number of field lines of both polarities retained in the $\overline{M}=0$ state is about the same as the retained field of one polarity.

Additionally, it is believed that the absence of an increase in the magnetic moment with an increase in temperature in the vanadium exhibiting diamagnetism indicates that even finite internal fields remaining after the sample is subjected to penetration from fields of both polarities exist with only one polarity present, i.e. flux annihilation appears to be complete for both $\overline{M}=0$ and $\overline{M}\neq 0$. Also, it is believed that in diamagnetic samples an appreciable portion of the retained field is uniformly dispersed through the sample. Furthermore, the behavior observed in actual tests, implies that annihilation is not restricted to the surface regions but is due to a mobility of the retained field in superconductors exhibiting apprecibale diamagnetism that is not present in samples in which the diamagnetic behavior is small.

Figure 4:
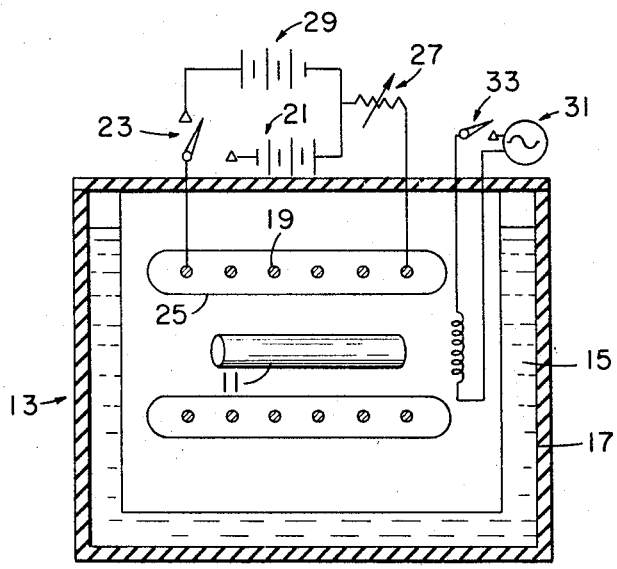
FIG. 4 is a partial cross-section of a superconductor means in accordance with one embodiment of this invention for selectively storing and releasing residual magnetic energy.

In a practical embodiment and example of this invention shown in FIG. 4, solid, cylindrical, right-circular cross-section, longitudinally extending, straight, commercially obtained wires 11 of Type II, 1:1, Nb-Ti material, having about 10 mil diameters and lengths of between ¼ and 1 inch, are cooled to 1° K. in a hollow cryostat 13 having a liquid cooling fluid 15 circulated into an annular insulated space 17 around the outside diameter thereof. Then the mass of the wire 11 is exposed to an appropriate hysteretic magnetic cycle employing externally applied fields of opposite polarities above or below the critical field of the sample. The magnetic field cycle is performed so that the total magnetic moment at the end of the cycle is zero when $H=0$. To this end, an external field is applied in a first step at a first polarity by energizing a copper solenoid 19 with electrical current therein in one direction from source 21 by closing switch 23 to produce field lines 25 parallel to the axis of the wire 11 and above the critical field $H_c$ thereof. In solenoid 19, the current flow is into the plane of the paper of FIG. 4 in one portion of the solenoid 19 shown in the figure in cross-section and the current flow is opposite in the other portion of the solenoid shown in the figure. Advantageously, the external field is increased through variable resistance 27 to a field strength of about 5000 gauss, although higher fields may be used, and is applied and removed slowly to limit heating in the wire 11 to a low value, e.g., over several minutes to limit heating to a millidegree Kelvin or less. The current flow in the copper solenoid is then reversed by moving switch 23 to connect coil 19 to a source of opposite current flow, such as battery 29, thereby to change the polarity of the externally applied field. This opposite current flow in coil 19 is increased and removed slowly as before through suitable means, such as variable resistor 27, to increase this external field in a second step whose field strength is between about 10 to 500 gauss. Alternately, a switch for reversing the battery connections from coil 19 to one battery may be used. The magnetism stored in this way corresponds to the amount of residual magnetic moment that is removed and is, therefore, variable.

Advantageously, only two steps are required to reduce the residual magnetic moment to zero, but since the exact composition and geometry of each sample 11 is slightly different, more than two steps may be used. In this case the first step employs the largest field and the subsequent steps employ field strengths less than the first step. However, the third and subsequent steps are progressively larger than the second step until the residual magnetic moment is removed. Also, the first step is of one polarity and all the steps after the first step are of the opposite polarity until the magnetic moment of the sample is reduced to zero after the externally applied magnetic field is removed in the last step of the hysteretic magnetic cycle. Thereupon, the heating of the wire 11 to a temperature between 1° K. and the critical temperature of the wire 11, such as with a small constant electrical heating means 31 and having an off-on switch 33 causes the sample to develop a magnetic moment that increases approximately linearly to a maximum with temperature. Upon further heating the magnetic moment decreases approximately linearly to zero at the critical temperature $T_c$ of the wire 11. Other heating means 31, such as a variable electrical heating means in the cryostat 13, or suitable means outside the cryostat for circulating cooling fluid 15, such as liquid nitrogen, through space 17 at a predetermined temperature, may alternately be used.

In practice, this invention was found operable with 1:1 Nb-Ti, however, vanadium was also operable after it was heat treated in a manner so that initial shielding and the diamagnetic behavior with field reversals was greatly reduced. Thus, any type II superconductor may be used when the diamagnetic behavior is reduced sufficiently. Also, changes in retained fields for $H=0$ with temperature is observed in various alloys of conventional superconductors exhibiting appreciable diamagnetic behavior initially and with field reversals. In these systems, retained fields in $H=0$ formed by cycles involving one polarity of H decrease with increasing temperature. However, when cycles involving both polarities or senses of externally applied field are used, the internal fields do not change initially with temperature over finite temperature regions, and a further temperature increase below the critical temperature $T_c$ is necessary to expel the retained field, which is then expelled with monotonic temperature dependence.

It is believed that this relatively simple behavior is associated with diamagnetism since it has not been observed in the same material when the diamagnetic behavior was reduced by appropriate heat treatment. In this case the retained fields formed from both senses of H appear to go through maxima with increasing temperature.

While the above description refers to a preferred embodiment, it is understood that the superconductor 11 of this invention for storing magnetism may be a plurality of superconducting wires, each wire being like the wire of FIG. 4, in a closely packed bundle.

In still another embodiment, the superconductor 11 may be a bar shaped Type II superconductor to which the described hysteretic cycle and warming may be applied.

While this invention has been described in various embodiments for producing strong, variable, localized magnetic fields for applications in the field of physics, such as in deflecting or confining charged particles for accelerator or thermonuclear reactor applications, the method and the apparatus of this invention are useful in a broad range of applications where deflection or confinement of charged particles, or the change in magnetic states is required. One example of the later is in polarizing neutrons such as described in U.S. Pat. 3,067,365. Another example of the latter would be in the field of information storage by magnetic means, such as described in U.S. Pats. 3,253,159 and 3,182,294.

This invention thus provides a practical and efficient system for storing magnetic energy in a superconductor by employing appropriate hysteretic magnetic cycles using both senses of an externally applied magnetic field whereby upon heating the superconductor develops a magnetic moment that increases with temperature, goes through a maximum and decreases to zero at the critical temperature. Moreover, the field has been locally stored in actual tests to values of 3 kg. or above in various materials, comprising type II superconductors such as Nb-Ti, and released in a simple method and apparatus that is applicable to a wide range of systems in the fields of physics where variable magnetic fields are desired.

As the foregoing relates to various embodiments of this invention and numerous modifications and alterations thereof may be made therein without departing from the spirit and scope of the invention, it is intended that the appended claims define the scope of this invention.

What is claimed is:
1. The method of selectively storing and releasing magnetic energy in a mass of 1:1 Nb-Ti wires having uniformly small diameters that extend longitudinally along an axis, comprising:
    (a) subjecting said mass to a first temperature below its critical superconducting temperature;
    (b) exposing said mass to a hysteretic magnetic field cycle, comprising sequentially, selectively, externally applying and removing magnetic fields having positive and negative senses and field lines parallel to said axis of said mass to provide it with stored residual magnetic field energy and zero residual magnetic moment when the last of said externally applied magnetic fields is removed at the end of said cycle; and
    (c) warming said mass to a second temperature to release at least a portion of said stored magnetic field energy from said mass below the critical temperature thereof.

2. The method of claim 1 in which the removal of said field during said hysteretic magnetic field cycle is gradual to limit heating effects to a millidegree Kelvin during said removal.

3. The method of claim 1 in which said mass is cooled to 1° K., exposed in said hysteretic magnetic field cycle to a first magnetic field of >5000 gauss and an opposite magnetic field weaker than said first field, said mass thereafter being warmed to its critical temperature to release a maximum magnetic field of between about 0–5 kg. during said warming from said first temperature to said critical temperature.

4. The method of claim 1 in which said warming of said mass increases the release of said stored residual magnetic field energy to a maximum at a second temperature below the critical temperature of said mass and decreases the release of said stored magnetic field energy to zero upon further warming of said mass from said second temperature to the critical temperature of said mass.

5. The method of claim 1 in which said magnetic fields applied externally in said magnetic hysteretic cycle, comprise a first field above the critical field of said mass is applied and removed gradually, and second weaker fields whose sense is opposite to the sense of said first field and which are sequentially applied and removed gradually in steps of increasing field strength, said application and removal of said first and second fields being gradual to minimize heating of said superconductor above said first temperature.

6. The invention of claim 1 in which said magnetic fields applied externally in said hysteretic magnetic cycle comprises a first field below the critical field of said superconductor, and a second opposite field of weaker field strength.

References Cited

UNITED STATES PATENTS 3,377,577    4/1968    Heise _____ 317—123 X

J. D. MILLER, Primary Examiner

W. J. SMITH, Assistant Examiner